(12) United States Patent
Sasaki et al.

(10) Patent No.: US 10,322,631 B2
(45) Date of Patent: Jun. 18, 2019

(54) FUEL FILLING APERTURE OPENING AND CLOSING DEVICE

(71) Applicant: NIFCO INC., Yokosuka-shi, Kanagawa (JP)

(72) Inventors: Hiroshi Sasaki, Yokosuka (JP); Hideaki Takahashi, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 189 days.

(21) Appl. No.: 15/303,400

(22) PCT Filed: Apr. 6, 2015

(86) PCT No.: PCT/JP2015/060750
§ 371 (c)(1),
(2) Date: Oct. 11, 2016

(87) PCT Pub. No.: WO2015/156252
PCT Pub. Date: Oct. 15, 2015

(65) Prior Publication Data
US 2017/0036535 A1  Feb. 9, 2017

(30) Foreign Application Priority Data

Apr. 11, 2014  (JP) ................................. 2014-082156

(51) Int. Cl.
*B60K 15/04* (2006.01)
(52) U.S. Cl.
CPC .......... *B60K 15/0406* (2013.01); *B60K 15/04* (2013.01); *B60K 2015/0429* (2013.01);
(Continued)
(58) Field of Classification Search
CPC ............... B60K 15/0406; B60K 15/04; B60K 2015/0429; B60K 2015/0445;
(Continued)

(56) References Cited

U.S. PATENT DOCUMENTS 3,075,547 A * 1/1963 Scaramucci ............ F16K 15/03
137/516.29
4,825,902 A * 5/1989 Helms ..................... E21B 21/10
137/515
(Continued)

FOREIGN PATENT DOCUMENTS

CA          2489626 A1    6/2005
CN        101823427 A     9/2010
(Continued)

OTHER PUBLICATIONS

PCT International Search Report of PCT/JP2015/060750 dated Jun. 23, 2015.
(Continued)

*Primary Examiner* — Andrew D Perreault
(74) *Attorney, Agent, or Firm* — Manabu Kanesaka

(57) ABSTRACT

A fuel filling aperture opening and closing device includes a closing member turned to an open position to open a fuel filling aperture by an introduction of a fuel filling nozzle. The closing member is provided with a flap member having a ring-shaped seal member, and an urging device urging the flap member to be positioned at a closed position. The seal member is provided with seal portions respectively inside and outside, and one of the inner and outer seal portions is a plate-shaped portion pressed by the urging against a projection piece bordering an opening edge portion of a pass-through opening of the fuel filling nozzle, and the other of the inner and outer seal portions is formed by an inside circumferential projecting portion and an outside circumferential projecting portion respectively pressed against the flap member.

6 Claims, 13 Drawing Sheets

(52) U.S. Cl.
CPC ............... *B60K 2015/0445* (2013.01); *B60K 2015/0451* (2013.01); *B60K 2015/0461* (2013.01); *B60K 2015/0483* (2013.01)

(58) Field of Classification Search
CPC .... B60K 2015/0451; B60K 2015/0461; B60K 2015/0483; B60K 2015/048
USPC ....................................................... 220/86.2
See application file for complete search history.

(56) References Cited

U.S. PATENT DOCUMENTS

| | | | |
|---|---|---|---|
| 5,466,016 A * | 11/1995 | Briody | B60K 15/04 220/86.2 |
| 6,446,826 B1 * | 9/2002 | Foltz | B60K 15/04 220/203.01 |
| 6,968,874 B1 | 11/2005 | Gabbey et al. | |
| 7,147,018 B2 | 12/2006 | Krach et al. | |
| 7,306,017 B2 * | 12/2007 | Walkowski | B60K 15/04 141/301 |
| 2003/0136785 A1 | 7/2003 | Hagano | |
| 2004/0231728 A1 | 11/2004 | Martin et al. | |
| 2005/0126657 A1 | 6/2005 | Allman et al. | |
| 2005/0279405 A1 | 12/2005 | Martin et al. | |
| 2010/0218849 A1 * | 9/2010 | Hagano | B60K 15/04 141/350 |
| 2012/0192994 A1 | 8/2012 | Hagano | |
| 2013/0193140 A1 * | 8/2013 | Hagano | B60K 15/04 220/86.2 |

FOREIGN PATENT DOCUMENTS

| | | |
|---|---|---|
| DE | 10004240 A1 | 8/2001 |
| DE | 10336776 A1 | 3/2005 |
| JP | 2004-190518 A | 7/2004 |
| JP | 2004-345636 A | 12/2004 |
| JP | 2010-522118 A | 7/2010 |
| JP | 2010-234929 A | 10/2010 |
| JP | 2012-158215 A | 8/2012 |
| WO | 2013/046553 A1 | 4/2013 |

OTHER PUBLICATIONS

Europe Patent Office, "Search Report for European Patent Application No. 15777176.7," dated Jan. 26, 2018.
China Patent Office, "Office Action for Chinese Patent Application No. 201580028264.0," dated Apr. 4, 2018.

* cited by examiner

FUEL FILLING APERTURE OPENING AND CLOSING DEVICE

FIELD OF TECHNOLOGY

The present invention relates to a fuel filling aperture opening and closing device opening a fuel filling aperture by an insertion of a fuel filling nozzle to allow the insertion, and automatically closing the fuel filling aperture when the inserted fuel filling nozzle is pulled out.

BACKGROUND ART

As for an opening and closing device attached to an upper end of a fuel injection pipe, there is an opening and closing device shown in Patent Document 1. The opening and closing device includes a closing member turnably assembled relative to a main member, and such closing member closes an open portion from a back side of the fuel injection pipe by urging of a spring device. The closing member can contact a seal member provided on an upper face thereof with a seating face. In the opening and closing device of the Patent Document 1, the seal member has a Y shape in cross section, and this shape lowers a sealing performance when the back side of the fuel injection pipe, i.e. the inner side of a fuel tank has a pressure lower than that of the outside of the fuel tank. Also, this kind of seal member is made of a material having elasticity and easily swelling by fuel, so that in a case wherein the fuel is attached to the seal member, due to the aforementioned swelling, there causes a change at a position where the aforementioned seating face and seal member contact. This becomes a factor affecting a valve opening pressure of this kind of opening and closing device.

PRIOR ART DOCUMENT

Patent Document

Patent Document 1: Japanese Unexamined Patent Application Publication No. 2010-522118

SUMMARY OF THE INVENTION

Problems to be Solved by the Invention

A main object of the present invention is to improve a sealing performance of the fuel filling aperture when it is closed by this kind of fuel filling aperture opening and closing device so as to make more reliable and excellent.

Means for Solving the Problems

In order to obtain the aforementioned object, in the present invention, a fuel filling aperture opening and closing device is an opening and closing device comprising a closing member turned to an open position by an insertion of a fuel filling nozzle to open a fuel filling aperture, and the closing member is provided with a flap member including a ring-shaped seal member, and an urging device urging the flap member to be positioned at a closed position. Also, the seal member is provided with seal portions respectively inside and outside, and one of the inner and outer seal portions is a plate-shaped portion pressed by the aforementioned urging against a projection piece bordering an opening edge portion of a pass-through opening of the fuel filling nozzle, and the other of the inner and outer seal portions is formed by an inside circumferential projecting portion and an outside circumferential projecting portion respectively pressed against the flap member.

When the flap member forming the closing member is in the closed position, the plate-shaped portion which becomes one of the inner and outer seal portions of the seal member is pressed by the aforementioned urging against the aforementioned projection piece, and such urging force concentrates on a relatively narrow pressed portion against the projection piece so as to highly ensure a sealing performance of the plate-shaped portion. In a case wherein such projection piece is not provided, if the seal member swells by fuel, there is a possibility of changing a sealed portion where the seal member contacts relative to the opening edge portion of the aforementioned pass-through opening. However, due to the projection piece, even if the aforementioned swelling and the like occurs, the sealed portion does not change. Also, the other of the inner and outer seal portions of the seal member is formed by the inside circumferential projecting portion and outside circumferential projecting portion, so that not only when a back side of an inlet pipe has a high pressure, but also when the outside of the inlet pipe has a high pressure, one of the inside circumferential projecting portion and outside circumferential projecting portion, which is positioned on a higher pressure side, is pressed against the flap member by a pressure difference so as to enhance a sealing performance between the seal member and the flap member.

One of preferred aspects of the present invention is that the flap member is formed by an outside member and an inside member combined through the seal member; the plate-shaped portion of the seal member is positioned on an outer side of the outside member; and the inside circumferential projecting portion and outside circumferential projecting portion of the seal member are positioned between the inside member and the outside member.

Also, one of the preferred aspects of the present invention is that in the inside member, there is formed a communication hole communicating a space between the inner and outer seal portions to the back side of the inlet pipe.

Also, one of the preferred aspects of the present invention is that the seal member has an approximately L shape in cross section including a portion intersecting an axial direction of the inlet pipe, and a portion along the axial direction of the inlet pipe; and one portion of the portion intersecting the axial direction is the plate-shaped portion, and the inside circumferential projecting portion and outside circumferential projecting portion are provided at a terminal of the portion along the axial direction.

Also, one of the preferred aspects of the present invention is that the plate-shaped portion of the seal member is deformed in a direction of enhancing a firmly contacting performance relative to the projection piece bordering the opening edge portion of the pass-through opening when the back side of the inlet pipe has the high pressure.

Effect of the Invention

According to the present invention, a reliable and excellent sealing performance when the fuel filling aperture is closed can be obtained by the aforementioned seal member.

BEST MODES OF CARRYING OUT THE INVENTION

Figure 1:
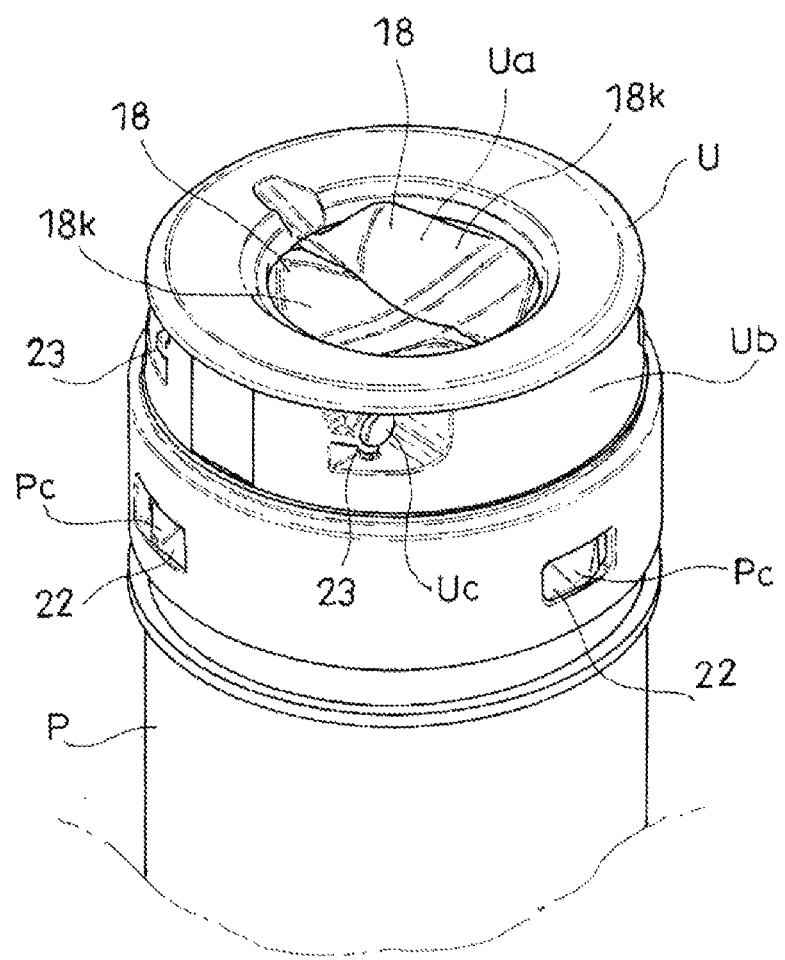
FIG. 1 is a perspective view showing a fuel filling aperture opening and closing device in a state attached to an upper end portion of an inlet pipe according to one embodiment of the present invention.
Figure 2:
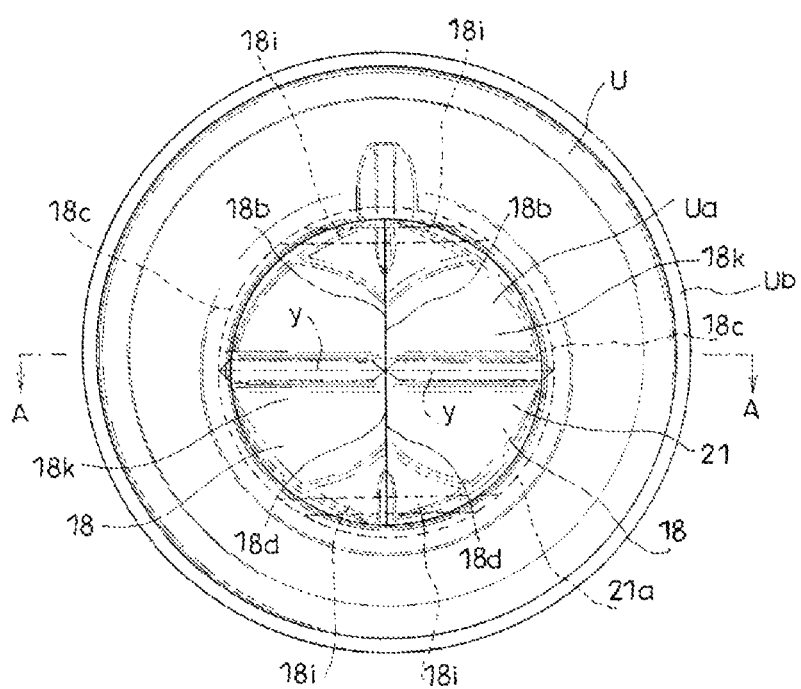
FIG. 2 is a plan view in the state of FIG. 1.

Hereinafter, based on FIG. 1 to FIG. 14, a typical embodiment of the present invention will be explained. An fuel filling aperture opening and closing device according to the present embodiment opens a fuel filling aperture by an insertion of a fuel filling nozzle N to allow the insertion, and automatically closes the fuel filling aperture when the inserted fuel filling nozzle N is pulled out.

Namely, when the fuel filling nozzle N of an fuel filling gun (omitted in the drawings) is inserted into the fuel filling aperture, such fuel filling aperture opening and closing device turns the later-described closing members La and Ua to an open position to allow the insertion of the fuel filling nozzle N forward more than the fuel filling aperture opening and closing device so as to allow fueling, and when the inserted fuel filling nozzle N is pulled out, the fuel filling aperture opening and closing device returns the later-described closing members La and Ua to a closed position to automatically close the fuel filling aperture. Thereby, in such fuel filling aperture opening and closing device, a cap of a screw-type fuel filling aperture is unnecessary.

Figure 4:
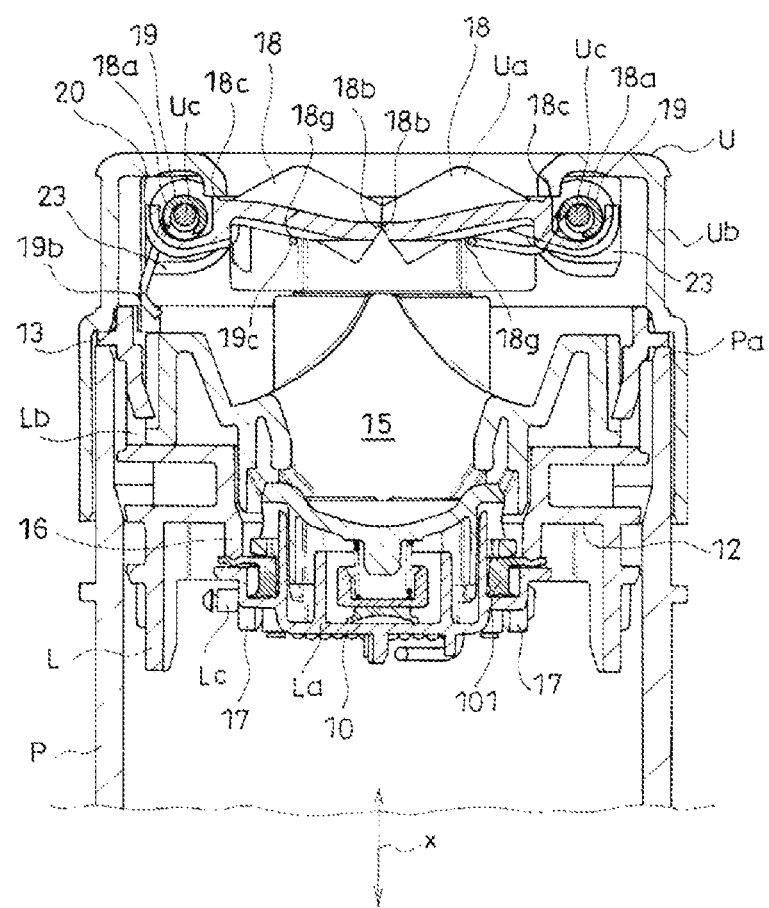
FIG. 4 is a cross-sectional view taken along a line A-A in FIG. 2.

In an illustrated example, the fuel filling aperture opening and closing device is attached to an upper end portion Pa forming the fuel filling aperture of an inlet pipe P (a fuel injection pipe) (see FIG. 4). In the illustrated example, in the upper end portion Pa of such inlet pipe P, there are attached two kinds of fuel filling aperture opening and closing devices having different functions. One of such two kinds of fuel filling aperture opening and closing devices is fitted into an inside of the upper end portion Pa of the inlet pipe P (hereinafter, such one fuel filling aperture opening and closing device is called a lower-side device L). In the other of such two kinds of fuel filling aperture opening and closing devices, the lower-side device L is fitted into an outside of the upper end portion Pa of the inlet pipe P from a state fitted into the upper end portion Pa of the inlet pipe P (hereinafter, such other fuel filling aperture opening and closing device is called an upper-side device U). Thereby, the closing member Ua of the upper-side device U is positioned directly above the closing member La of the lower-side device L. When an insertion operation of the fuel filling nozzle N is carried out, the fuel filling nozzle N abuts against the closing member Ua of the upper-side device U to turn the closing member Ua to the open position so as to enter into the fuel filling aperture, and then, abuts against the closing member La of the lower-side device L to turn the closing member La to the open position so as to completely open the fuel filling aperture.

(Lower-Side Device L)

Figure 7:
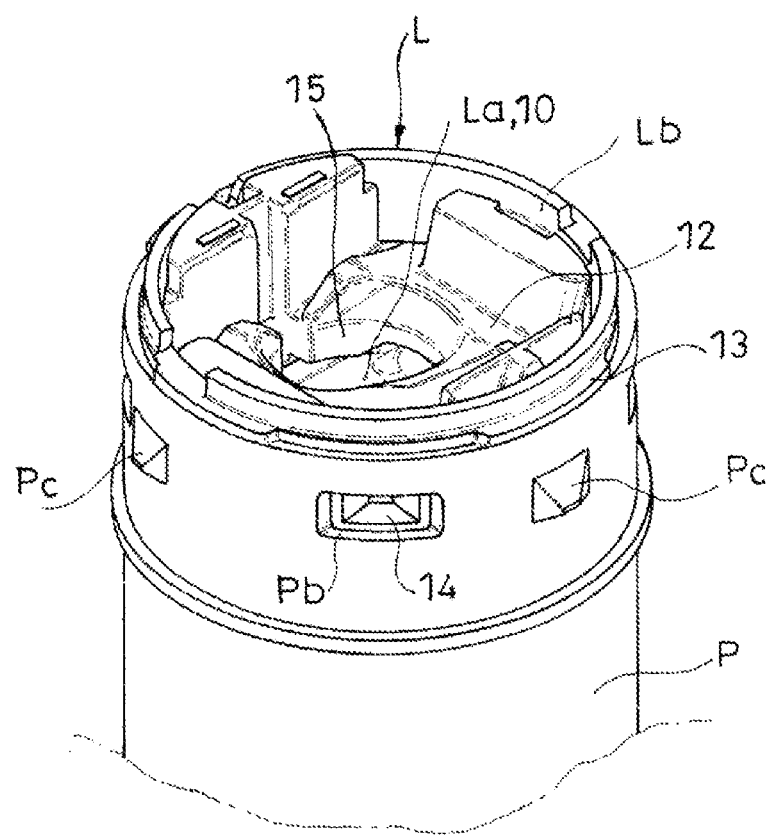
FIG. 7 is a perspective view showing a state wherein a lower-side device is attached to the inlet pipe and the upper-side device is omitted therein.
Figure 8:
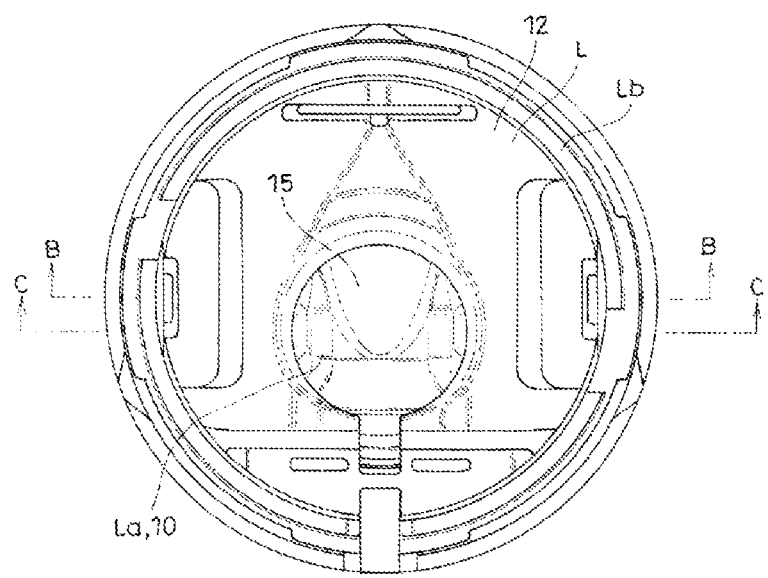
FIG. 8 is a plan view of the state of FIG. 7.

The aforementioned lower-side device L is provided with a cylindrical main member Lb and the closing member La (see FIG. 7). The cylindrical main member Lb opens both of an upper end and a lower end, and has a substantially cylindrical shape. Between the upper end and lower end, an internal space of the cylindrical main member Lb is divided into up and down by a partition wall 12. An outer diameter of the cylindrical main member Lb is substantially equal to an inner diameter of the upper end portion Pa of the inlet pipe P. In the illustrated example, in the upper end of the cylindrical main member Lb, there is formed an outer flange 13, and on an outer face portion of the cylindrical main member Lb, there is formed an engagement projection 14. In the upper end portion Pa of the inlet pipe P, there is formed an engagement hole Pb receiving the engagement projection 14 of the cylindrical main member Lb in a process of fitting the lower-side device L into the upper end portion Pa of the inlet pipe P up to a position where the outer flange 13 abuts against a terminal of the inlet pipe P, and engaged with the engagement projection 14 by an elastic return at a fitting completion position. Also, by the aforementioned engagement, a fitting state of the lower-side device L relative to the inlet pipe P is maintained. In the partition wall 12, there is formed a circular pass-through opening 15 allowing the fuel filling nozzle N to pass through. In the closed position, the closing member La is pressed against the partition wall 12 from a lower side to close the pass-through opening 15, thereby maintaining a closed state of the fuel filling aperture unless the fuel filling nozzle N is inserted (see FIG. 4).

Figure 9:
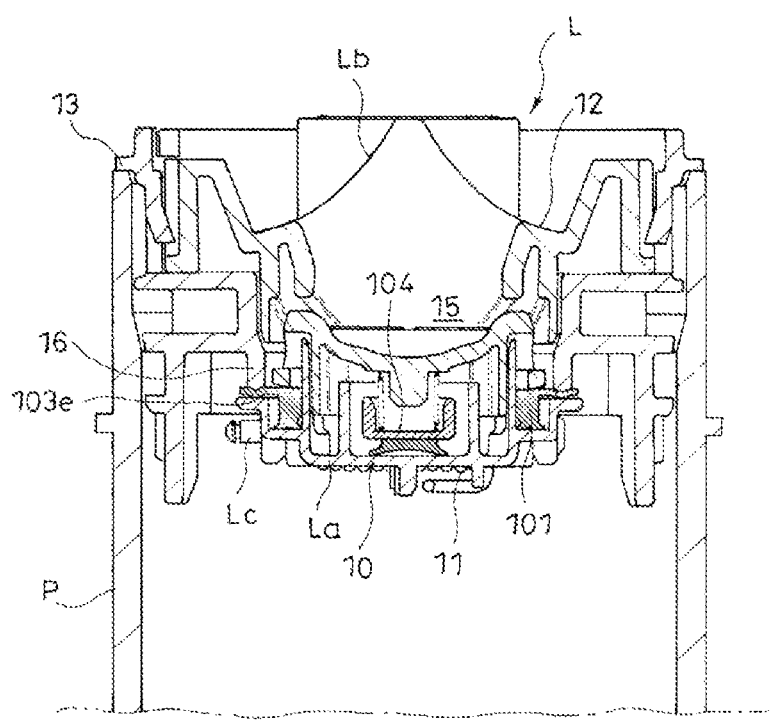
FIG. 9 is a cross-sectional view taken along a line B-B in FIG. 8.

On a lower face side of the partition wall 12, an opening edge portion of the pass-through opening 15 is bordered by a projection piece 16 (see FIG. 9). Namely, in a lower face of the partition wall 12, there is formed a short cylindrical portion by the projection piece 16. In the closed position, the closing member La presses a plate-shaped portion 101b (shown in FIG. 10) of the later-described seal member 101 against the projection piece 16 by urging of the later-described urging device 11 (shown in FIG. 3) to close the pass-through opening 15 in an airtight state. Namely, in the present embodiment, the projection piece 16 functions as a valve seat.

On the other hand, the closing member La is provided with a flap member 10 provided with the ring-shaped seal member 101; and the urging device 11 positioning the flap member 10 at the closed position by the urging.

Figure 10:
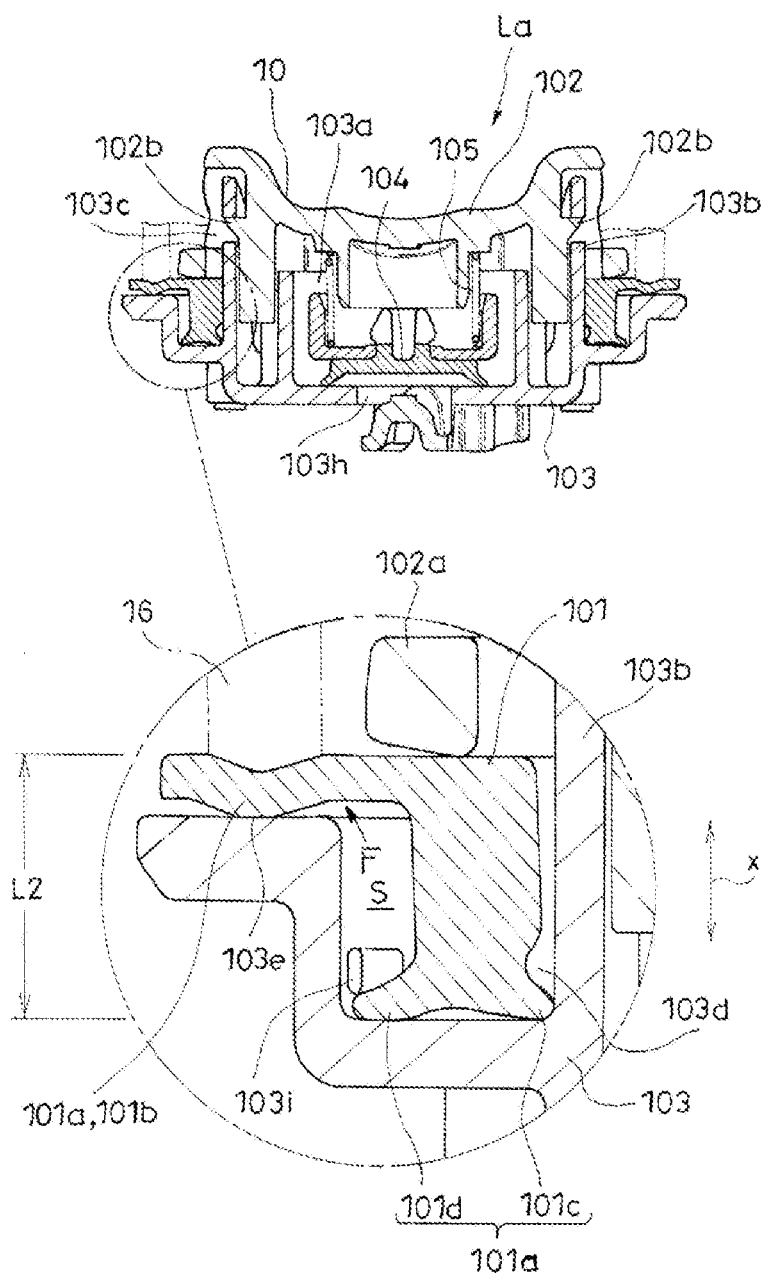
FIG. 10 is a cross-sectional view of the flap member forming the lower-side device taken along a line C-C in FIG. 8, and shows a projection piece bordering a pass-through opening with imaginary lines.
Figure 11:
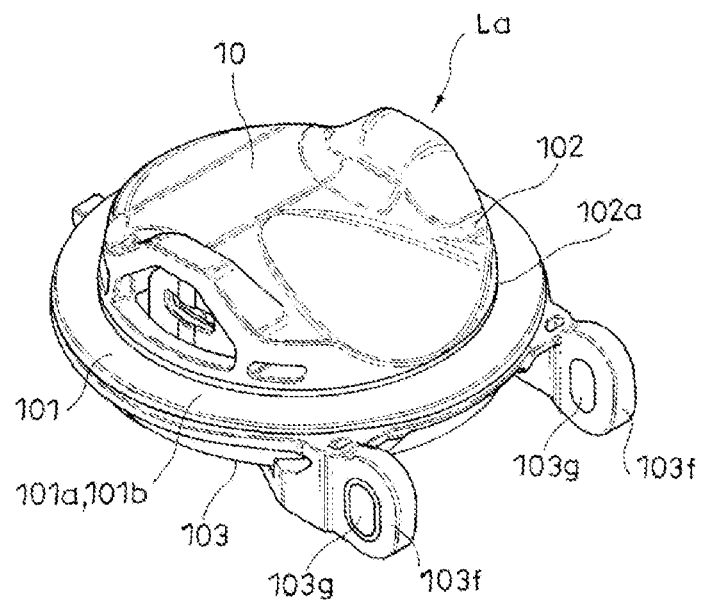
FIG. 11 is a perspective view of the flap member forming the lower-side device.
Figure 12:
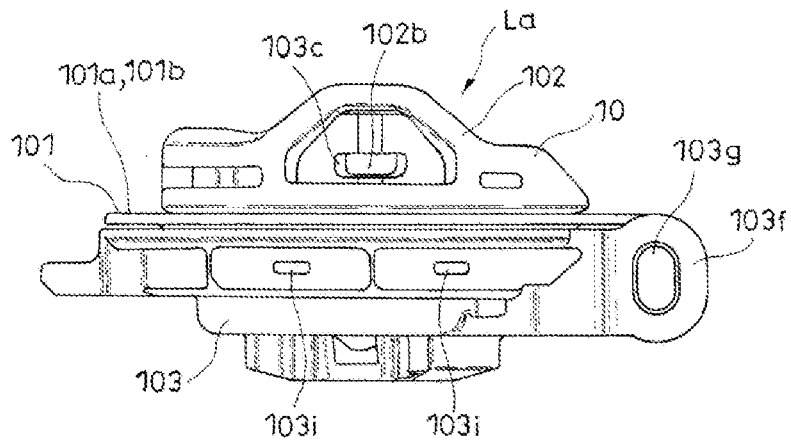
FIG. 12 is a side view of the flap member forming the lower-side device.
Figure 13:
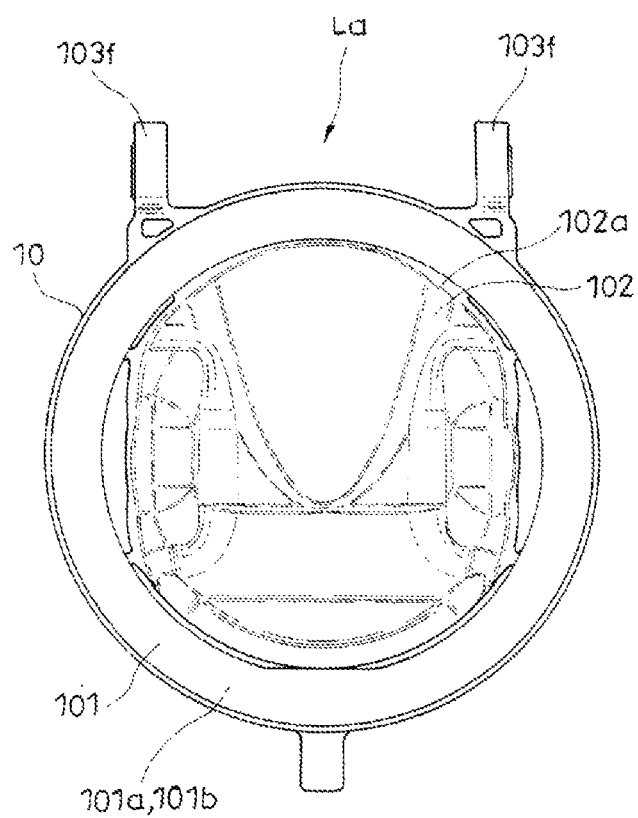
FIG. 13 is a plan view of the flap member forming the lower-side device.

The flap member 10 is formed by an outside member 102 and an inside member 103 combined through the seal member 101 (see FIG. 10 to FIG. 12). The outside member 102 is positioned on a terminal side of the inlet pipe P, and the inside member 103 is positioned on a back side of such inlet pipe P.

The inside member 103 substantially has a disk shape. On a surface side of the inside member 103, there are formed an inside circumferential wall 103a; an outside circumferential wall 103b surrounding the inside circumferential wall 103a; and a circumferential groove 103d surrounding the outside circumferential wall 103b (see FIG. 10). There is formed a circumferential flat face 103e between the circumferential groove 103d and an outer edge of the inside member 103.

Also, on a back surface side of the inside member 103, there is formed a pair of bearing portions 103f and 103f (see FIG. 11). The pair of bearing portions 103f and 103f respectively has an arm shape protruding from the back surface side of the inside member 103 to position a protruding end outward more than the outer edge of the inside member 103, and there is provided a shaft hole 103g at the protruding end. Also, in the illustrated example, there is formed a pair of bearing portions 17 and 17 below the partition wall 12 of the cylindrical main member Lb (see FIG. 3). In the illustrated example, the pair of bearing portions 103f and 103f of the inside member 103 is housed between the pair of bearing portions 17 and 17 of the cylindrical main member Lb, and a shaft member Lc is inserted to pass through the shaft hole 103g formed in the pair of bearing portions 103f, so that the closing member La is attached to the cylindrical main member Lb turnably around the shaft member Lc.

The outside member 102 has a size allowing the flap member 10 to be housed in the pass-through opening 15 in a state wherein the flap member 10 is in the closed position, and has a circular outline shape (see FIG. 11). The fuel filling nozzle N abuts against a surface of the outside member 102. On a back surface side of the outside member 102, there is formed a circumferential pinching portion 102a (see FIG. 10). Also, in a side portion of the outside member 102, and on an upper side of the circumferential pinching portion 102a, there are formed engagement claws 102b protruding outward respectively on both sides in a diametrical direction of the outside member 102.

In the illustrated example, in a state wherein the circumferential pinching portion 102a of the outside member 102 is positioned directly above the circumferential groove 103d of the inside member 103, and the circumferential flat face 103e of the inside member 103 is positioned outside an outer edge of the outside member 102, the engagement claw 102b of the outside member 102 is engaged with an engagement hole 103c formed in the outside circumferential wall 103b of the inside member 103, so that the outside member 102 and the inside member 103 are integrated.

In the illustrated example, there is formed a vent hole 103h on an inner side of the inside circumferential wall 103a of the inside member 103, and there are housed a compression coil spring 105 and a valve member 104 closing the vent hole 103h by urging of the aforementioned spring 105 between the inside member 103 and the outside member 102, and when a fuel tank side comes to have a high pressure with a predetermined value or above, such valve member 104 rises against the urging of the spring 105 to open the vent hole 103h. Namely, in the illustrated example, the flap member 10 includes a relief valve therein.

On the other hand, the seal member 101 is provided with seal portions 101a respectively on an inner peripheral portion side and an outer peripheral portion side such that a space S (shown in FIG. 10) between the inner and outer seal portions 101a and 101a is communicated to the back side of the inlet pipe P. Typically, such seal member 101 is made of rubber or plastic having rubber-like elasticity.

Also, in such seal member 101, one of the inner and outer seal portions 101a and 101a is formed by the plate-shaped portion 101b pressed by the urging against the projection piece bordering the opening edge portion of the pass-through opening 15 of the fuel filling nozzle N, and the other of the inner and outer seal portions 101a and 101a is formed by an inside circumferential projecting portion 101c and an outside circumferential projecting portion 101d respectively pressed against the flap member 10.

In the present embodiment, an outer diameter of the seal member 101 is approximately equal to an outer diameter of the inside member 103, and an inner diameter of the seal member 101 is approximately equal to an outer diameter of the outside circumferential wall 103b. Then, in the present embodiment, the seal member 101 includes the plate-shaped portion 101b on an outer periphery side thereof, and is provided with the inside circumferential projecting portion 101c and the outside circumferential projecting portion 101d on an inner periphery side thereof.

Specifically, the seal member 101 has an approximately L shape in cross section including a portion intersecting an axial direction x (see FIG. 4 and FIG. 10) of the inlet pipe P, and a portion along the axial direction x of the inlet pipe P (see FIG. 10), and one portion of the portion intersecting the axial direction is the plate-shaped portion 101b, and the inside circumferential projecting portion 101c and the outside circumferential projecting portion 101d are provided at a terminal of the portion along the axial direction.

Figure 14:
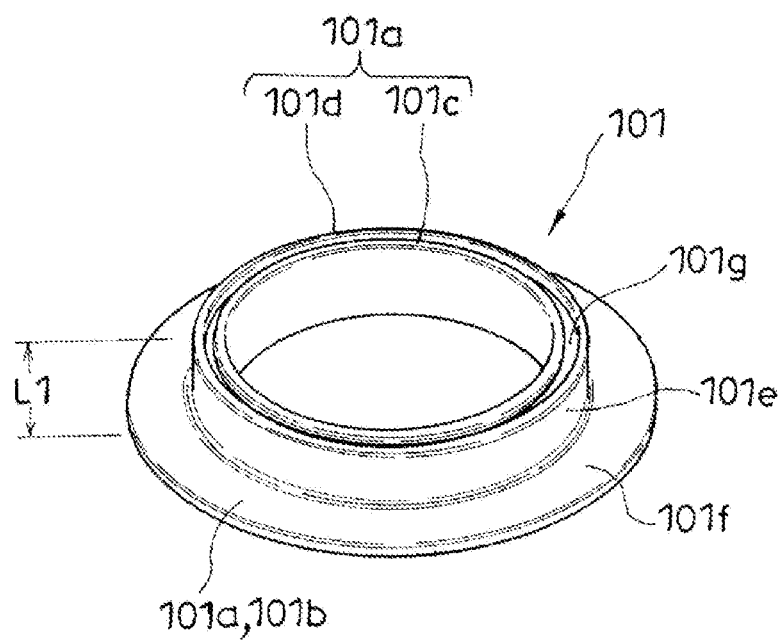
FIG. 14 is a perspective view wherein a seal member forming the lower-side device is viewed from an inlet pipe side.

In the illustrated example, the seal member 101 has a structure of forming a circumferential outer flange 101f which becomes the plate-shaped portion 101b at one cylinder end of a short cylinder member 101e, and forming a circumferential groove 101g at the other cylinder end of the short cylinder member 101e, and there are formed the outside circumferential projecting portion 101d and the inside circumferential projecting portion 101c by the other cylinder end of the short cylinder member 101e divided into the inside and outside by such circumferential groove 101g (see FIG. 14).

Also, a length L1 (shown in FIG. 14) of the short cylinder member 101e of the seal member 101 is longer than a distance L2 (shown in FIG. 10) between the circumferential pinching portion 102a of the outside member 102 and a groove bottom of the circumferential groove 103d of the inside member 103.

In the present embodiment, from a state wherein the seal member 101 is combined with the inside member 103 such that the short cylinder member 101e is housed inside the circumferential groove 103d of the inside member 103, and the outer flange 13 is positioned above the circumferential flat face 103e, the outside member 102 is combined with the inside member 103 in the aforementioned manner so as to hold the seal member 101 between such inside member 103 and outside member 102. Thereby, the plate-shaped portion 101b of the seal member 101 is positioned on an outer side of the outside member 102, and the inside circumferential projecting portion 101c and the outside circumferential projecting portion 101d of the seal member 101 are positioned between the inside member 103 and the outside member 102.

The inside circumferential projecting portion 101c of the seal member 101 is pressed against the groove bottom of the circumferential groove 103d in an elastically deformed state wherein the inside circumferential projecting portion 101c is narrowed inward, and the outside circumferential projecting portion 101d is pressed against the groove bottom of the circumferential groove 103d in an elastically deformed state wherein the outside circumferential projecting portion 101d opens outward, so that the plate-shaped portion 101b is pinched between the projection piece 16 and the circumferential flat face 103e in a state wherein the plate-shaped portion 101b is bent such that an upper side becomes a bent inside by the projection piece 16 (FIG. 10).

Figure 3:
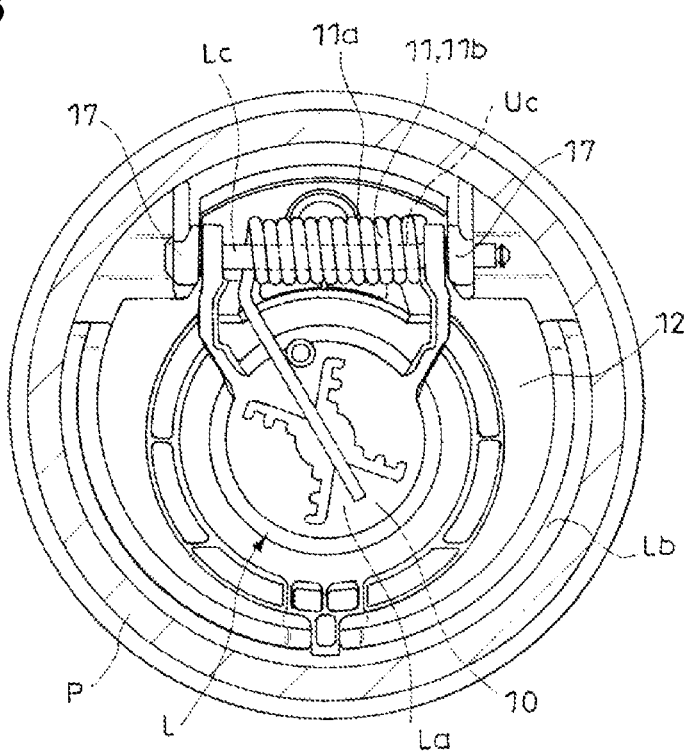
FIG. 3 is a bottom view in the state of FIG. 1.

In the illustrated example, the urging device 11 is a torsion coil spring 11a (see FIG. 3). In the illustrated example, the shaft member Lc passes through a spring winding portion 11b between the pair of bearing portions 103f and 103f of the inside member 103, and one spring end of the torsion coil spring 11a wherein the spring winding portion 11b is held abuts against the back surface side of the inside member 103, and the other spring end of the torsion coil spring 11a abuts against the partition wall 12 so that an urging force toward the closed position constantly acts on the flap member 10.

Also, in the present embodiment, in the inside member 103, there is formed a communication hole 103i communicating the space S between the inner and outer seal portions 101a and 101a to the back side of the inlet pipe P. In the illustrated example, such communication hole 103i is formed on a groove wall outside the circumferential groove 103d of the inside member 103 (see FIG. 10), thereby providing a state wherein the space S between the plate-shaped portion 101b and the outside circumferential projecting portion 101d is communicated with the back side of the inlet pipe P, i.e. the fuel tank side.

When the flap member 10 forming the closing member La is in the closed position, the plate-shaped portion 101b which becomes one of the inner and outer seal portions 101a and 101a of the seal member 101 is pressed against the projection piece by the urging, and such urging force concentrates on a relatively narrow pressed portion against the projection piece 16 so as to highly ensure a sealing performance of the plate-shaped portion 101b. In a case wherein such projection piece is not provided, if the seal member 101 swells by fuel, there is a possibility of changing a sealed portion where the seal member 101 contacts relative to the opening edge portion of the aforementioned pass-through opening 15. However, due to the projection piece 16, even if the aforementioned swelling and the like occurs, the sealed portion does not change.

Also, the other of the inner and outer seal portions 101a and 101a of the seal member 101 is formed by the inside circumferential projecting portion 101c and the outside circumferential projecting portion 101d, so that not only when the back side of the inlet pipe P has a high pressure, but also when the outside of the inlet pipe P has a high pressure, one of the inside circumferential projecting portion 101c and the outside circumferential projecting portion 101d, which is positioned on a higher pressure side, is pressed against the flap member 10 by a pressure difference so as to enhance a sealing performance between the seal member 101 and the flap member 10.

In the illustrated example, the seal member 101 communicates the space S between the inner and outer seal portions 101a and 101a to the back side of the inlet pipe P. Also, the outside circumferential projecting portion 101d is pressed against the groove bottom of the circumferential groove 103d in the elastically deformed state wherein the outside circumferential projecting portion 101d opens outward, and the inside circumferential projecting portion 101c is pressed against the groove bottom of the circumferential groove 103d in the elastically deformed state wherein the inside circumferential projecting portion 101c is narrowed inward (see FIG. 10), so that when the back side of the inlet pipe P has the high pressure, due to this pressure, the outside circumferential projecting portion 101d is pressed against the flap member 10 (the groove bottom of the circumferential groove 103d) to enhance the sealing performance between the seal member 101 and the flap member 10. On the contrary, when the outside of the inlet pipe P has the high pressure, due to this pressure, the inside circumferential projecting portion 101c is pressed against the flap member 10 (the groove bottom of the circumferential groove 103d) to enhance the sealing performance between the seal member 101 and the flap member 10.

Also, in the present embodiment, the plate-shaped portion 101b is pinched between the projection piece 16 and the circumferential flat face 103e in the state wherein the plate-shaped portion 101b is bent such that the upper side becomes the bent inside by the projection piece 16, and when the back side of the inlet pipe P has the high pressure, a force shown in FIG. 10 with a symbol F acts on a terminal of the plate-shaped portion 101b. Thereby, in the present embodiment, the plate-shaped portion 101b of the seal member 101 is deformed in a direction of enhancing a firmly contacting performance relative to the projection piece 16 bordering the opening edge portion of the pass-through opening 15 when the back side of the inlet pipe P has the high pressure.

(Upper-Side Device U)

The aforementioned upper-side device U is provided with a cylindrical main member Ub and the closing member Ua (see FIG. 1). The cylindrical main member Ub opens a lower end, is provided with an inner flange 20 in a circumferential manner at an upper end, and has a form wherein an upper end opening which becomes a pass-through opening 21 of the fuel filling nozzle N is narrowed by the inner flange 20 (see FIG. 5). Namely, such cylindrical main member Ub substantially has a cylindrical shape. An inner diameter of the cylindrical main member Ub is substantially equal to an outer diameter of the upper end portion Pa of the inlet pipe P. In the illustrated example, in an outer face portion of the cylindrical main member Ub, there are formed engagement holes 22 (see FIG. 1). In the upper end portion Pa of the inlet pipe P, there are formed engagement projections Pc engaging the engagement holes 22 by an elastic return when the upper-side device U is fitted into the upper end portion Pa of the inlet pipe P by receiving the upper end portion Pa of the inlet pipe P into the cylindrical main member Ub (see FIG. 7), and by the aforementioned engagement, a fitting state of the upper-side device U relative to the inlet pipe P is maintained (see FIG. 1). In the closed position, the closing member Ua presses the inner flange 20 from a lower side to close the pass-through opening 21, thereby maintaining the closed state of the fuel filling aperture unless the fuel filling nozzle N is inserted (see FIG. 4).

On the other hand, the closing member Ua is provided with a pair of flap members 18 and 18, and an urging device 19 positioning each flap member 18 to the closed position by urging (see FIG. 4).

The pair of flap members 18 and 18 is respectively provided with turning assembly portions 18a which become a center of the turning; and abutment portions 18b relative to the other flap member 18 forming the pair, and by the aforementioned urging, the pair of flap members 18 and 18 presses a surface portion thereof against an opening edge portion 21a of the pass-through opening 21 of the fuel filling nozzle N, and presses the abutment portion 18*b* against the abutment portion 18*b* of the other flap member 18 forming the pair.

In the illustrated example, the pass-through opening 21 has a circular shape. The flap member 18 respectively has a plate-shaped member with a semicircular shape in a plan view provided with a semi-arc edge portion 18*c* along an arc for 180 degrees of a virtual circle (omitted in the drawings) wherein an outer diameter thereof is slightly larger than a hole diameter of the pass-through opening 21; and a straight edge portion 18*d* dividing the virtual circle along a virtual segment (omitted in the drawings) passing a center of the virtual circle (see FIG. 2). The pair of flap members 18 and 18 presses each semi-arc edge portion 18*c* against the opening edge portion 21*a* of the pass-through opening 21 from below by the urging, and presses the straight edge portion 18*d* of one flap member 18 against the straight edge portion 18*d* of the other flap member 18 so as to close the pass-through opening 21 together with the other flap member 18 (FIG. 4).

Figure 6:
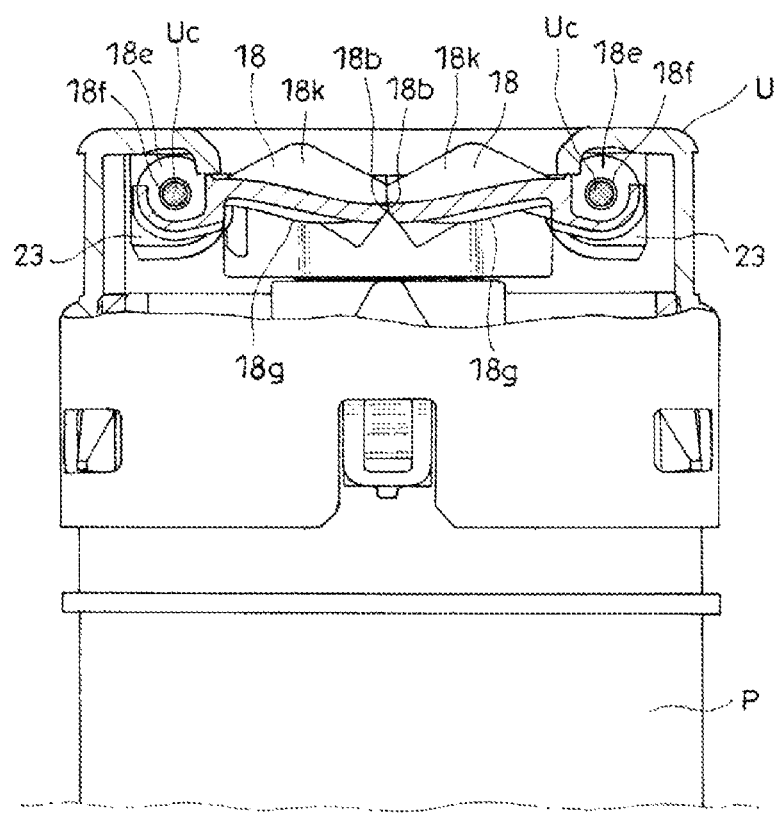
FIG. 6 is an exploded side view of essential parts showing the essential parts of the upper-side device in cross section, wherein an urging device of a flap member of the upper-side device is omitted therein.

In each flap member 18, there is formed a pair of bearing portions 18*e* and 18*e* (see FIG. 6). The pair of bearing portions 18*e* and 18*e* respectively has an arm shape protruding outward from the semi-arc edge portion 18*c* in a direction intersecting the straight edge portion 18*d*, and is provided with a shaft hole 18*f* at a protruding end. Also, in the illustrated example, below the inner flange 20 of the cylindrical main member Ub, there is formed a pair of bearing portions 23 and 23. In the illustrated example, the pair of bearing portions 18*e* and 18*e* of the flap member 18 is housed between the pair of bearing portions 23 and 23 of the cylindrical main member Ub, and a shaft member Uc is inserted to pass through the shaft hole 18*f* formed in the pair of bearing portions 18*e* and 18*e*, so that the flap member 18 is attached to the cylindrical main member Ub turnably around the shaft member Uc. A shaft center line of such shaft member Uc is parallel to the straight edge portion 18*d*.

Figure 5:
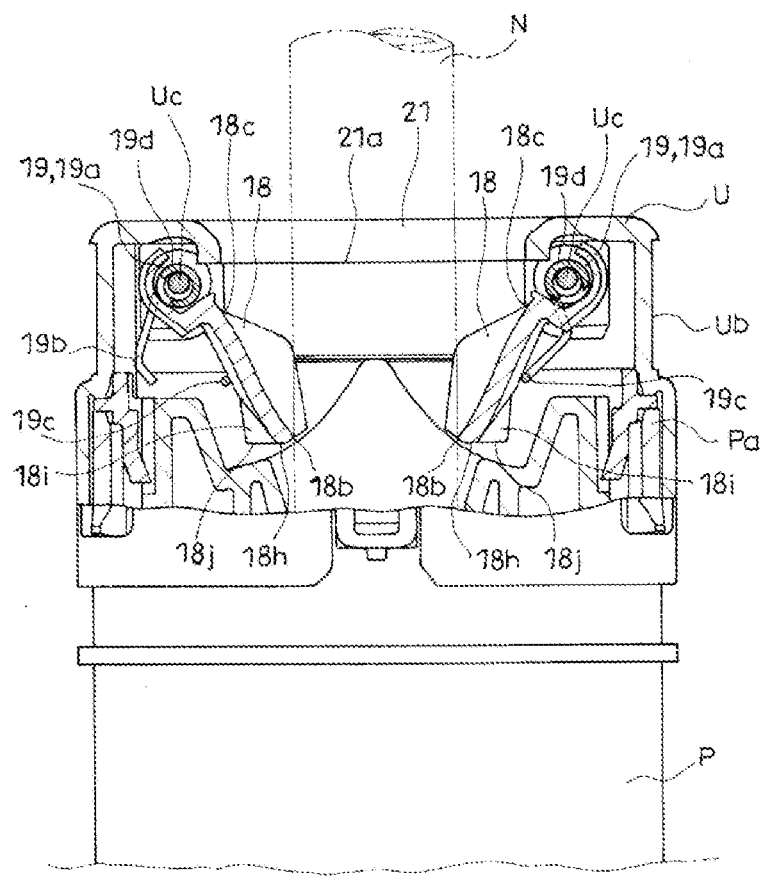
FIG. 5 is an exploded side view of essential parts showing an insertion state of a fuel filling nozzle, wherein a closing member of an upper-side device is in an open position.

On the other hand, the urging device 19 is a torsion coil spring 19*a* wherein one spring end 19*b* abuts against a support member side of the flap member 18, i.e. the cylindrical main member Ub, and the other spring end 19*c* abuts against an inclined face 18*g* formed in a back surface portion of the flap member 18 in a direction of gradually increasing a thickness of the flap member 18 as approaching the abutment portion 18*b* (see FIG. 4 and FIG. 5). In the illustrated example, the other spring end 19*c*, of the torsion coil spring 19*a* wherein a spring winding portion 19*d* is held by passing the shaft member Uc through the spring winding portion 19*d* between the pair of bearing portions 18*e* and 18*e* of the flap member 18, abuts against a back surface side of the flap member 18; and one spring end 19*b* of the torsion coil spring 19*a* abuts against an inside wall of cylindrical main member Ub, so that an urging force toward the closed position constantly acts on the flap member 18.

Also, in the present embodiment, a portion except for the semi-arc edge portion 18*c* of the surface portion of the flap member 18 is formed roughly in a concave shape wherein a portion positioned on a virtual straight line y (shown in FIG. 2) connecting a middle position in a length direction of the semi-arc edge portion 18*c* and a middle position in a length direction of the straight edge portion 18*d* is the bottom. Also, corresponding to the shape of the surface portion, a portion except for the semi-arc edge portion 18*c* of the back surface portion of the flap member 18 is formed roughly in a convex shape wherein a portion positioned on the virtual straight line y connecting the middle position in the length direction of the semi-arc edge portion 18*c* and the middle position in the length direction of the straight edge portion 18*d* is the peak. Then, in the illustrated example, in a portion positioned on the virtual straight line in the back surface portion of such flap member 18, there is formed the inclined face 18*g*.

In the illustrated example, the inclined face 18*g* starts from the semi-arc edge portion 18*c*, and ends at a middle position in a length direction of the virtual straight line y (see FIG. 4). Also, the abutment portion 18*b* is a vertical face along the axial direction x of the inlet pipe P, and is formed over the whole length of the straight edge portion 18*d*.

Also, the flap member 18 houses the shaft member Uc in the shaft hole 18*f* provided in the bearing portion 18*e* of the flap member 18 with room, and is turnably supported in the cylindrical main member Ub as the support member. Namely, an inner diameter of the shaft hole 18*f* is larger than an outer diameter of the shaft member Uc (see FIG. 6).

The other spring end 19*c* of the torsion coil spring 19*a* abuts against the inclined face 18*g*, so that in the flap member 18 returned to the closed position by receiving an urging force of such spring 19*a*, there acts a force in a direction of pressing the abutment portion 18*b* thereof against the abutment portion 18*b* of the other flap member 18 forming the pair as well. Thereby, in the present embodiment, in the closed position, the abutment portions 18*b* of the pair of flap members 18 and 18 abut against each other with a small gap (see FIG. 4).

Also, in the present embodiment, on the back surface portion of the flap member 18, there are provided guide faces 18*h* contacting one portion of the other flap member 18 to guide the other flap member 18 to the closed position when there occurs a deviation of timing for returning to the closed position by the urging between the pair of flap members 18 and (see FIG. 5). In the illustrated example, on a lower side of the abutment portion 18*b*, there is formed the guide face 18*h* inclining in a direction of gradually increasing the thickness of the flap member 18 as separating from the abutment portion 18*b* over the whole length of the straight edge portion 18*d*. In the illustrated example, there are formed the guide faces 18*h*, and mountain-shaped ribs 18*i* at a corner portion between the straight edge portion 18*d* and the semi-arc edge portion 18*c*, and one of oblique sides of the rib 18*i* is an extension guide face 18*j* continuing to the guide face 18*h*.

Also, in the present embodiment, the surface portion of the flap member 18 is formed in a concave shape in the aforementioned manner, and on the surface portion, there are formed groove-shaped concave portions 18*k* having an arc shape in a cross-sectional shape in a direction parallel to a center axis line of the turning. In the illustrated example, a bottom of such groove-shaped concave portion 18*k* is lowered as approaching the abutment portion 18*b*. Thereby, in the present embodiment, when the fuel filling nozzle N is not inserted in a direction wherein a center axis line of the fuel filling nozzle N to be inserted corresponds to a center axis line of the fuel filling aperture, i.e. a center axis line of the inlet pipe P, a tip of the fuel filling nozzle N is guided to take the aforementioned direction by the aforementioned groove-shaped concave portion 18*k*.

Incidentally, obviously, the present invention is not limited to the embodiment explained hereinabove, and includes all embodiments which can obtain the object of the present invention.

EXPLANATION OF SYMBOLS

N an fuel filling nozzle
La a closing member 10 a flap member
101 a seal member
101b a plate-shaped portion
101c an inside circumferential projecting portion
101d an outside circumferential projecting portion
11 an urging device
15 a pass-through opening
16 a projection piece Incidentally, all contents of the specification, claims, drawings, and abstract of Japanese Patent Application No. 2014-082156 filed on Apr. 11, 2014 are cited in their entireties herein and are incorporated as a disclosure of the specification of the present invention.

What is claimed is:

1. A fuel filling aperture opening and closing device, comprising:
   a closing member turned to an open position by an insertion of a fuel filling nozzle to open a fuel filling aperture,
   wherein the closing member includes a flap member including a ring-shaped seal member, and an urging device urging the flap member to be positioned at a closed position,
   the seal member includes inner and outer seal portions respectively circumferentially formed at an inside portion and an outside portion thereof,
   one of the inner and outer seal portions is a plate-shaped portion pressed by urging against a projection piece bordering an opening edge portion of a pass-through opening through which the fuel filling nozzle is configured to be inserted in the fuel filling aperture, and the other of the inner and outer seal portions comprises an inside circumferential projecting portion, an outside circumferential projecting portion circumferentially arranged outside the inside circumferential projecting portion, and a first circumferential groove intervened between the inside circumferential projecting portion and the outside circumferential projecting portion, the inside circumferential projecting portion and the outside circumferential projecting portion respectively protruding downwardly to be pressed against the flap member,
   the inner seal portion comprises the inside circumferential projecting portion, the outside circumferential projecting portion, and the first circumferential groove; and the outer seal portion is the plate-shaped portion,
   the inside circumferential projecting portion is arranged to extend toward an inside of the pass-through opening in the flap member and the outside circumferential projecting portion is arranged to extend toward an outside of the pass-through opening in the flap member,
   the flap member includes:
      an outside member having a circumferential pinching portion circumferentially outwardly extending from the outside member, and
      an inside member having an outside circumferential wall, a groove bottom wall circumferentially outwardly extending from the outside circumferential wall, a groove outer wall upwardly extending from an outer end of the groove bottom wall, a circumferential flat face circumferentially outwardly extending from an upper end of the groove outer wall, and a second circumferential groove surrounded by the outside circumferential wall, the groove bottom wall, and the groove outer wall and arranged under the circumferential pinching portion, and
   the inner seal portion is arranged in the second circumferential groove to be pressed in an axial direction of the closing member between the circumferential pinching portion and the groove bottom wall, and the outer seal portion circumferentially outwardly extends from the inner seal portion to be pressed in the axial direction of the closing member between the projection piece and the circumferential flat face.

2. A fuel filling aperture opening and closing device according to claim 1, wherein the inside member includes a communication hole communicating a space between the inner and outer seal portions to a back side of an inlet pipe.

3. A fuel filling aperture opening and closing device according to claim 1, wherein the plate-shaped portion of the seal member is deformed in a direction of enhancing a firmly contacting performance relative to the projection piece bordering the opening edge portion of the pass-through opening when a back side of an inlet pipe has a high pressure.

4. A fuel filling aperture opening and closing device according to claim 1, wherein the inner seal portion has an outer diameter shorter than an inner diameter of the groove outer wall to form a space between the inner seal portion and the inside member so that the inside circumferential projecting portion is deformed toward the outside circumferential wall in the second circumferential groove and the outside circumferential projecting portion is deformed toward the groove outer wall in the second circumferential groove.

5. A fuel filling aperture opening and closing device according to claim 4, wherein the groove outer wall includes a communication hole communicating an inside of the groove outer wall with an outside of the groove outer wall so that the outside circumferential projection portion seals between the outside member and the inside member of the flap member when the outside of the groove outer wall has a high pressure.

6. A fuel filling aperture opening and closing device according to claim 1, further comprising:
   a cylindrical main member including the pass-through opening formed thereinside, and the projection piece protruding downwardly from the cylindrical main member to press the plate-shaped portion and bordering the opening edge portion of the pass-through opening,
   wherein the pass-through opening is communicated with the fuel filling aperture at one end of the projection piece, and
   the plate-shaped portion is pressed between the projection piece and the circumferential flat face to seal between the cylindrical main member and the closing member, and the inside circumferential projecting portion and the outside circumferential projecting portion are pressed against the flap member to seal between an inside of the closing member and an outside of the closing member relative to the fuel filling aperture.

* * * * *